Patented Jan. 13, 1931

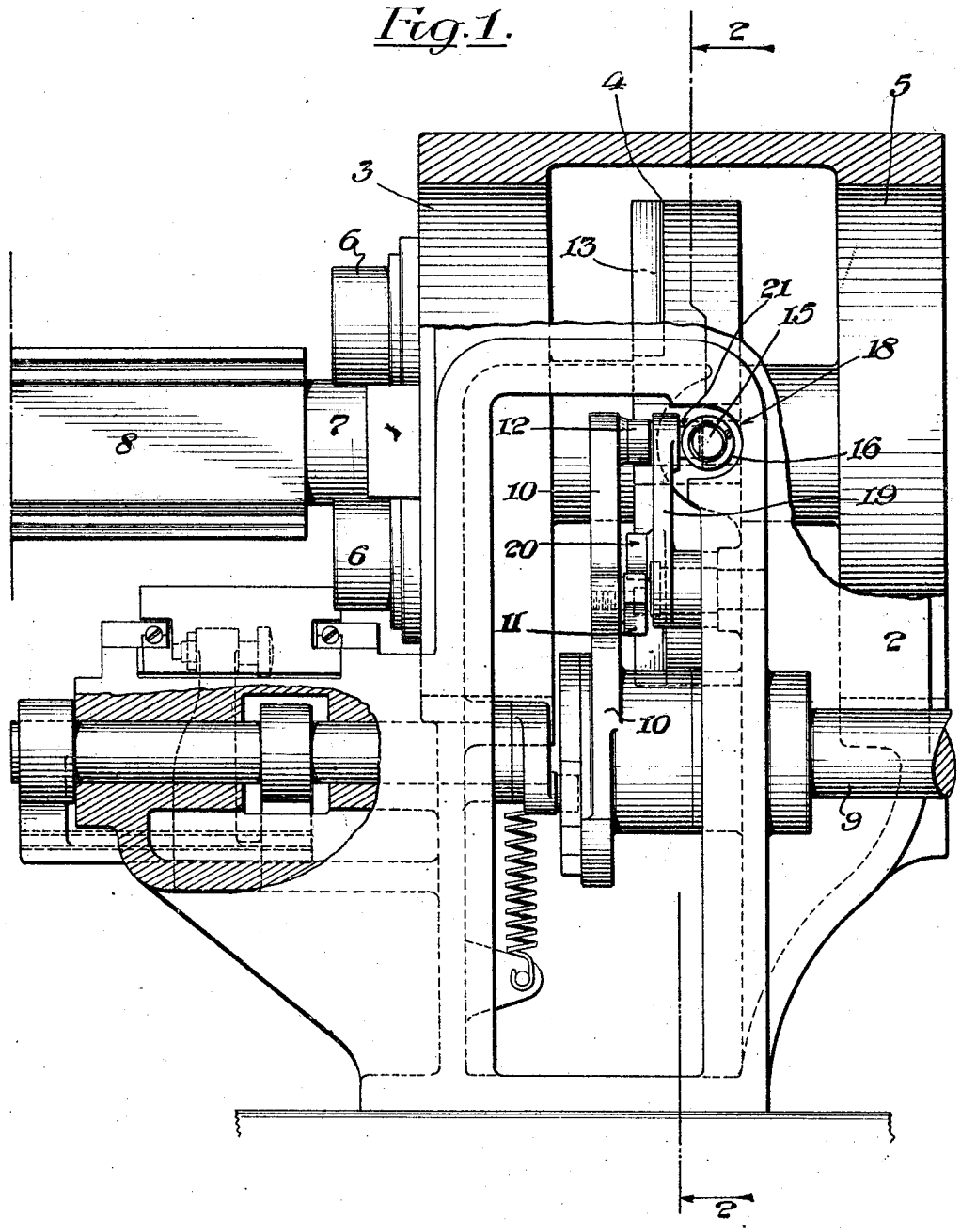

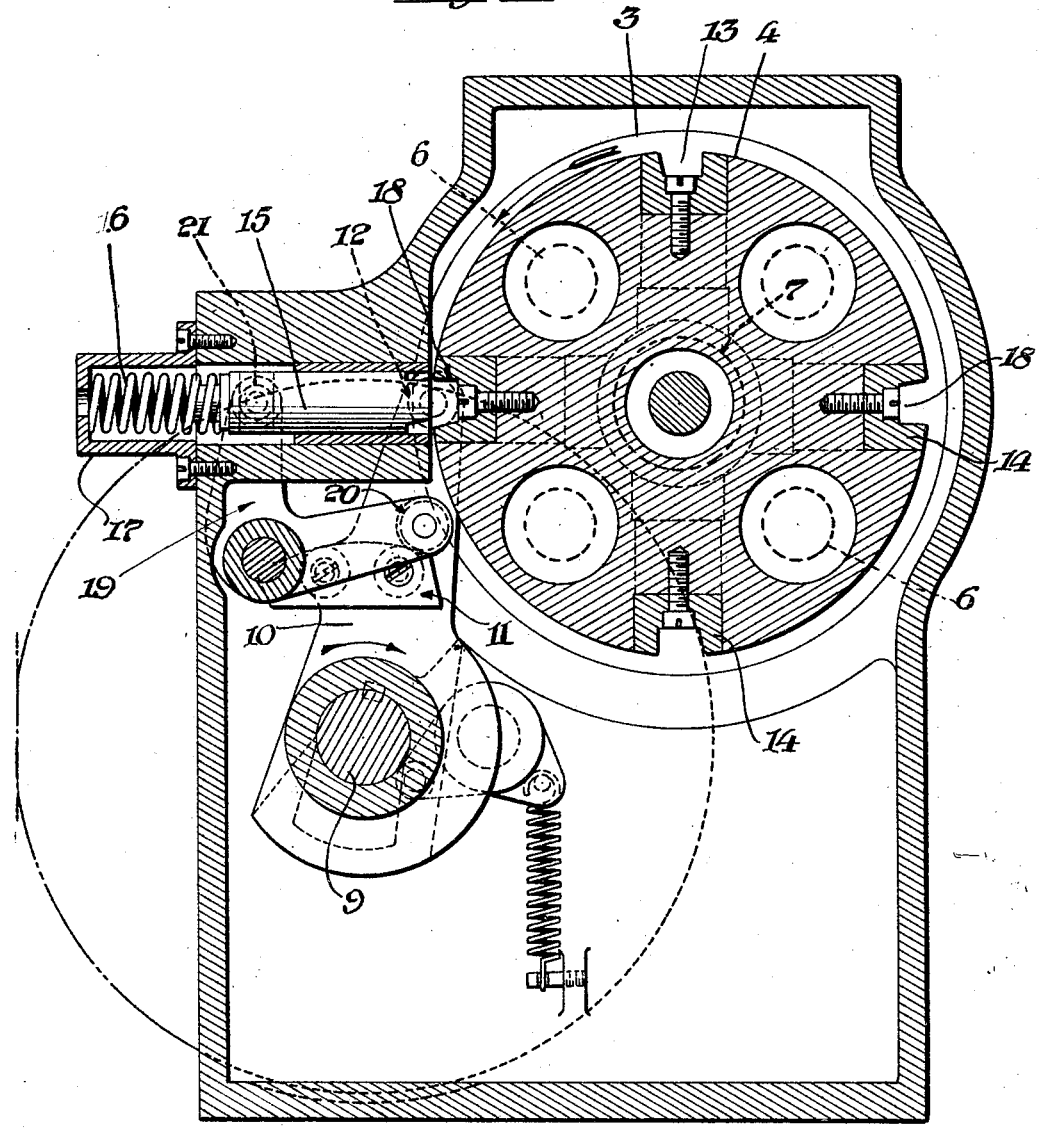

1,788,423

UNITED STATES PATENT OFFICE

ALFRED E. DRISSNER, OF CLEVELAND, OHIO, AND CHARLES Q. GAREY, OF WINDSOR, VERMONT, ASSIGNORS TO THE NATIONAL ACME COMPANY, OF CLEVELAND, OHIO, A CORPORATION OF OHIO

INDEXING MECHANISM FOR AUTOMATIC MULTIPLE-SPINDLE-SCREW MACHINES

Application filed October 4, 1928. Serial No. 310,270.

This invention relates to metal working machines, such as those commonly known as automatic screw machines and more particularly to the indexing and locking mechanism for the work spindle carrier of an automatic spindle screw machine, the object of the invention being to provide an improved indexing and locking mechanism, the former effective to equally distribute the strain of indexing between the front and rear bearings of the spindle carrier with the result that a more efficient and freer indexing of the carrier is obtained and chattering or jumping of and tendency to tip the carrier avoided, and the latter effective more efficiently to lock the cylinder and prevent the scarring and gouging of the bearing surfaces of the cylinder from chips or small particles which may be chipped off from the lock bolt seats by the locking bolts.

A further object of the invention is the provision of an improved indexing mechanism which will free the rear end of the carrier from all obstructions so that any type of spindle bearing may be used and which will also permit the parts of the indexing mechanism to be more readily machined and assembled.

A further object of the invention is the provision of an improved locking mechanism which will likewise free the ends of the carrier from all obstructions and which will also free the bearing ends of the carrier from injury by the small particles or chips coming from the lock bolt seats.

Heretofore, it has been the practice in machines of this class where it was desired to use a Geneva indexing mechanism, to index the work spindle carrier or cylinder by means located at the rear thereof since it was impossible to use the Geneva movements except at the end of the cylinder, and to lock the cylinder by means located at the front thereof. As the cylinder with its rotating work spindles is quite a heavy piece of mechanism, it follows that the strain of indexing was considerable, this strain largely coming upon one end of the cylinder and causing a tipping and binding at the opposite end because the strain was not equalized upon the bearings of the cylinder, and, consequently there was a chattering or jumping of the cylinder at times and considerable wear upon the cylinder bearings, requiring their frequent adjustment or renewal. Furthermore, when the cylinder was indexed from the end by certain forms of indexing means, only certain types of work spindle bearings could be used because the amount of metal left for boring to accommodate the spindle bearings was very much limited, whereas by indexing in the improved manner herein about to be described, the rear end of the cylinder is free from all obstructions and consequently any type of bearing for the spindles at the front or rear of the carrier may be used since there is sufficient metal left to accommodate bores suitable for either straight, tapered or anti-friction bearings.

Furthermore, where the locking bolt was located at the end, as for instance at the front of the cylinder, as the operation of this bolt at times tended to chip small particles from the locking bolt seat, these particles or chips would fall into such position as to scar and gouge the bearing surfaces of the cylinder, but by reason of the present improvement any such small particles now fall into the intervening space between the front bearings of the cylinder and the indexing disk of the cylinder and therefore do not cause any damage to the machine and this is a very important feature of the present improvement, which is an improvement upon the indexing mechanism shown and described in our co-pending application, Serial No. 254,973, filed February 17, 1928, in that in the present improvement the cylinder is both indexed and locked substantially midway of its length through the medium of a central disk carried by or formed as part of the cylinder.

In the drawings accompanying and forming part of this specification, Fig. 1 is a side view of so much of an automatic multiple spindle screw machine as is deemed necessary to illustrate for the purpose of showing the present improvement, and Fig. 2 is a cross sectional view thereof taken on line 2—2, Fig. 1.

Similar characters of reference indicate corresponding parts in the several views.

Before explaining in detail the present improvement and mode of operation thereof, we desire to have it understood that the invention is not limited to the details of construction and arrangement of parts which are illustrated in the accompanying drawings, since the invention is capable of other embodiments, and that the phraseology which we employ is for the purpose of description and not of limitation.

In the present improvement the work spindle carrier comprises a centrally bored member or hub 2 provided with three disks 3, 4 and 5, the disk 4 being located intermediate or substantially midway between the disks 3 and 5, which latter constitute the end disks of the carrier, and are properly supported by suitable bearings in the casing or housing for the carrier. The intermediate disk 4 is preferably of much smaller diameter than the end disk. Thus, what may be properly termed a skeleton form of work carrier is provided in which the central disk may be formed as a part of the hub or secured thereto in any suitable way, as desired. In these disks are mounted the desired number of rotary work spindles 6, which, however, have their bearings only in the two end disks, passing through the center disk with sufficient clearance (see Fig. 2) so that none of the shock of these work spindles, which continuously rotate at high speed and carry and rotate the stock or work bars which are frequently up to fifteen feet (15 ft.) in length, is transmitted to the center disk or to the indexing mechanism and, consequently, the shock of indexing is not transmitted to the spindle bearings and is equalized between the work cylinder or carrier bearings. when this carrier is used with a Gridley automatic, the front end disk receives one end of a tube or shaft 7 upon which a sliding tool carrier 8 is mounted. Through this shaft 7 and the hub 2 a rotary main driving shaft passes for driving the rotary work spindles in the usual way. Located in the bed of the machine is a cam shaft 9 rotated by suitable means provided for that purpose and the carrier is intermittently rotated or indexed from this cam shaft. Secured to the cam shaft is a revolving arm 10 carrying a cam 11 and a roll 12.

The forward face of the intermediate disk 4 is provided with a plurality of guideways or indexing slots 13 which, in the present instance, are formed by suitably machining the disk to provide these slots. In these slots are located hardened steel straps 14 which are suitably fastened in position for contact with the roll 12 of the indexing arm 10. The number of slots will, of course, correspond with the number of indexing movements that the carrier is to have. In the present instance four of these slots are shown, and the roll 12 of the arm 10 enters these slots at the proper time and at the precise moment that the locking bolt hereinafter described is withdrawn from contact with the spindle carrier and so indexes the carrier. This indexing of the carrier is usually done on fast speed and by means of this Geneva indexing mechanism a uniformly accelerated and retarded motion is imparted to the spindle carrier, which permits extremely rapid and positive indexing and by reason of the fact that the strain of indexing is equalized since the carrier is indexed midway of its length, all shocks either at starting or stopping of the indexing operation are avoided so that the carrier and its operating mechanisms are not subjected to destructive strain, and consequently chattering, jumping and tipping of the carrier are prevented. Furthermore, as the strain of indexing is equalized between the bearings of the carrier provided at the front and rear thereof within the housing or casing of the carrier friction is materially reduced, thus facilitating a freer indexing movement of the carrier.

The locking bolt mechanism in the present instance also cooperates with the intermediate disk instead of with the end of the cylinder as heretofore, in consequence of which the strain of locking is more equally distributed over the cylinder and the cylinder is more effectively locked while any particles or chips which may be knocked off the bolt seats by the locking bolts will fall in the rear of the front bearing of the cylinder and in the space between the disks and therefore will not gouge or scar the bearing surfaces as formerly they ofttimes did.

The lock bolt mechanism in the present instance comprises a spring-actuated bolt 15 forwardly propelled by a heavy coil spring 16 carried in a suitable housing 17 into suitable seats 18 formed in the periphery of the intermediate disk 4 of the spindle carrier. This bolt is controlled by the cam 11 carried by the indexing arm 10, this cam being carried into position by this indexing arm to engage a roller 20 located on the end of a pivoted bell crank lever 19, the opposite end of which is also provided with a roller 21 adapted to cooperate with a collar of the lock bolt 15 whereby the lock bolt is withdrawn by means of this cam 11 just prior to the indexing movement, and is forced forward by its coil spring into the bolt seats of the intermediate disk of the cylinder. The cam 11 is so formed that it will release the lock bolt and permit it to engage the carrier at the precise moment when the indexing roller 12 of the indexing arm 10 leaves the indexing slot.

From the foregoing it will be seen that by indexing the spindle carrier substantially midway of its length, not only are the strains of indexing equalized, the jumping, tipping, and chattering of the carrier prevented, but a more even wearing of the carrier bearings is obtained, while the entire rear disk is left free so that it may be suitably bored for the reception of either straight, tapered or antifriction bearings for the work spindles and that, furthermore, the parts of the indexing mechanism are more easily machined and assembled, while the center disk can also be made of smaller diameter than the front and rear disks, which also has certain advantages.

It will also be observed that by locking the cylinder through the intermediate disk and therefore substantially centrally of the cylinder a more efficient locking is obtained since there is a more equal distribution of the strain on the cylinder and that all liability of injuring the bearing surfaces of the cylinder by particles or chips knocked off of the bolt seats by the bolts during the operation thereof is avoided, since such chips or particles will fall into the space between the intermediate disk and the forward disk of the cylinder.

Thus, in the present improvement, it will be observed that instead of indexing the cylinder by means located at one end and locking it by means located at the other end, as has been the common practice, we are enabled to index and lock the cylinder at substantially the same point, and not only this, but index and lock it substantially midway of the cylinder thereby freeing the ends of the cylinder from obstructive mechanisms, thereby greatly simplifying the machine and reducing the expense of manufacturing thereof, and not only this, but by reason of the form of cylinder shown we are enabled to use a Geneva movement for indexing the cylinder, which has heretofore been impossible to do except at the ends of the cylinder, since a Geneva movement requires the use of an arm which must project inwardly of the cylinder toward the axis thereof, and which obviously is impossible of use with other forms of cylinders or spindle carriers.

In these metal working machines the work spindle carrier is provided with continuously-rotating work spindles which rotate at high speed, and these work spindles carry stock or work bars projecting beyond the rear ends thereof which are frequently fifteen feet (15 ft.) in length. As these bars necessarily vibrate to a certain extent, the shock on the work spindles and their bearings in the work cylinder, as well as on the work cylinder and its bearings, is considerable. When the indexing means, in the form of a Geneva movement or any other form, is located on the end disks, either outside or inside and, therefore, right where the bearings for the work spindle carrier are located, as there is also considerable shock in indexing the carrier, especially during the starting and stopping of the carrier, this shock, of course, not only has its effect upon the bearings but upon the whole machine, and has caused considerable trouble in the past. Many attempts have been made to reduce this shock, but with only partial success.

In the present improvement, by applying the Geneva indexing movement to the central disk, the shock of indexing is practically taken away from the work spindles and equalized on the cylinder bearings. By reason of the fact that the work spindles pass through the central disk with sufficient clearance to be free thereof and have their bearings only in the front and rear disks, the shock of the indexing movement is transmitted through the entire length of the central tube 7 surrounding the spindle driving shaft, upon which tube the sliding tool carrier is mounted and which tube is supported at the outer end by the bed of the machine and at the inner end by the work spindle carrier which is likewise supported on the bed of the machine. Consequently very little, if any, of the shock is transmitted to the bearings of the work spindle carrier, while the shock of the rotary work spindles carrying the long work bars is not transmitted to the indexing mechanism since this is carried by the central disk which is entirely free of the rotary work spindles. Thus a quicker and more efficient indexing is the result, with less shock and strain and less wear on the bearings. In other words, such shocks as are necessarily present and cannot be eliminated are spread or transmitted throughout the machine instead of, as heretofore, coming directly upon the bearings of the work cylinder when the cylinder is indexed or coming directly upon the indexing mechanism during the rotation of the work spindles with their long stock bars.

Furthermore, by having the locking mechanism engaging the centrally-located disk, not only are the advantages hereinbefore pointed out obtained, but any jar or shock due to the sudden locking of the spindle carrier after each indexing is practically freed from the work spindles and more equally distributed instead of coming directly over the bearings of the work carrier as heretofore.

It is to be understood that by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. In a machine of the class described, the combination of an indexible work spindle carrier comprising a front and a rear disk and a spaced intermediate disk, and means cooperating with the intermediate disk for indexing and locking the carrier.

2. In a machine of the class described, the combination of an indexible work spindle carrier comprising a front and rear disk and a spaced intermediate disk, means cooperating with the intermediate disk for indexing the carrier, said means comprising a rotary cam shaft, an arm secured thereto and having means cooperating with said intermediate disk, and means also cooperating with said intermediate disk for locking the carrier intermediate the indexing movement thereof.

3. In a machine of the class described, the combination of an indexible work spindle carrier comprising a bored hub having a plurality of disks, one located at each end thereof and one intermediate of and spaced from said end disks, means co-operating with the intermediate disk for indexing the carrier, and means also cooperating with the intermediate disk for locking the carrier.

4. In a machine of the class described, the combination of an indexible work spindle carrier comprising a bored hub having a plurality of disks, one located at each end thereof and one intermediate of and spaced from said end disks, means cooperating with the intermediate disk for indexing the carrier and comprising a plurality of guideways carried on the face of said intermediate disk, a cam shaft, an arm mounted thereon and having means co-operating with said guideways for indexing the carrier, and means also cooperating with said intermediate disk for locking the carrier.

5. In a machine of the class described, the combination of an indexible work spindle carrier comprising a plurality of substantially equally spaced disks, Geneva formed means cooperating with the disk located midway of the carrier for indexing the carrier, and means also cooperating with the same disk for locking it in its indexed position.

6. In a machine of the class described, the combination of an indexible work spindle carrier comprising a plurality of substantially equally spaced disks, means cooperating with the disk located midway of the carrier for indexing the carrier, and means also co-operating with the same disk for locking it in its indexed position, said locking mechanism being controlled by the indexing mechanism.

7. In a machine of the class described, the combination of an indexible work spindle carrier comprising a skeleton form of carrier made up of a bored hub and three disks spaced apart, a cam shaft, an arm carried thereby and having means cooperating with the intermediate disk for indexing the carrier, and locking mechanism also controlled by the cam shaft and cooperating with the intermediate disk for locking the carrier in its indexed position.

8. In a machine of the class described, the combination of an indexible work spindle carrier comprising a skeleton form of carrier made up of a bored hub and three disks spaced apart, a cam shaft, an arm carried thereby and having means cooperating with the intermediate disk for indexing the carrier, locking mechanism also controlled by the cam shaft for locking the carrier in its indexed position, said locking mechanism comprising a bolt also cooperating with the intermediate disk, and means carried by said indexing arm for operating said bolt.

9. In a machine of the class described, the combination of an indexible work spindle carrier comprising a skeleton form of carrier made up of a bored hub and three disks spaced apart, a cam shaft, an arm carried thereby and having means cooperating with the intermediate disk for indexing the carrier, locking mechanism also controlled by the cam shaft for locking the carrier in its indexed position and comprising a spring-actuated bolt also cooperating with the intermediate disk, a bell crank lever co-operating with said bolt, and a cam carried by said indexing arm for operating said bell crank lever.

10. In an indexing mechanism for rotary carriers, the combination of a carrier having a disk substantially midway of its ends, means cooperating with said disk for indexing the carrier, and means also cooperating with said disk for locking the carrier.

11. In an indexing mechanism for rotary carriers, the combination of a carrier having a disk substantially midway of its ends, means cooperating with said disk for indexing the carrier, and means also cooperating with said disk for locking the carrier, said locking means being controlled by the indexing means.

12. In a multiple spindle screw machine having a sliding tool carrier, the combination of an indexible work spindle carrier comprising a pair of end disks and an intermediate spaced disk, a cam shaft, means carried thereby and cooperating with the intermediate spaced disk for indexing the carrier, and means also cooperating with the intermediate spaced disk for locking the carrier.

13. In a multiple spindle screw machine having a sliding tool carrier, the combination of an indexible work spindle carrier comprising a pair of end disks and an intermediate spaced disk, a cam shaft, means carried thereby and cooperating with the intermediate spaced disk for indexing the carrier, and means also cooperating with the intermediate spaced disk for locking the carrier, said indexing means comprising an arm secured to the cam shaft and provided with a roller at its end and a plurality of guideways carried by the intermediate disk for the reception of said roller.

14. In a multiple spindle screw machine having a sliding tool carrier, the combination of an indexible work spindle carrier comprising a pair of end disks and an intermediate spaced disk, a cam shaft, means carried thereby and cooperating with the intermediate spaced disk for indexing the carrier, and means also cooperating with the intermediate spaced disk for locking the carrier, said indexing means comprising an arm secured to the cam shaft and provided with a roller at its end and a plurality of guideways carried by the intermediate disk for the reception of said roller and said locking means comprising a locking bolt and spaced seats carried by the intermediate disk for the reception of said bolt.

15. In a machine of the class described, the combination of an indexible work spindle carrier, a Geneva indexing means including a swinging arm co-operating with a face of the carrier located substantially midway of the length thereof and between the periphery and the axis of the carrier, and means co-operating with that part of the carrier located substantially midway of the length thereof for locking the carrier.

16. In a machine of the class described, the combination of an indexible work spindle carrier having a centrally-located disk, means co-operating with a side face of said disk between the periphery and the axis thereof for indexing the carrier, and means co-operating with the centrally-located disk for locking the carrier.

17. In a machine of the class described, the combination of an indexible work spindle carrier comprising a plurality of substantially-equally spaced disks, including a substantially centrally-located disk, means co-operating with the side face of said centrally-located disk and between the periphery and the axis thereof for indexing the carrier, and means co-operating with the centrally-located disk for locking the carrier.

18. In a machine of the class described, the combination of an indexible work spindle carrier, a Geneva indexing means including a swinging arm co-operating with a face of the carrier located substantially midway of the length thereof and between the periphery and the axis of the carrier, and means controlled by the indexing mechanism for locking the carrier substantially midway of its length in its indexed position.

19. In a machine of the class described, the combination of an indexible work spindle carrier having a centrally-located disk and a pair of end disks, rotatable work spindles supported for rotation by the end disks and passing through the centrally-located disk with sufficient clearance so as to be free thereof, means co-operating with the centrally-located disk of the carrier for indexing the carrier, and means co-operating with the centrally-located disk for locking the carrier.

20. In a machine of the class described, the combination of an indexible work spindle carrier having a centrally-located disk and a pair of end disks rotatable work spindles supported for rotation by the end disks and passing through the centrally-located disk with sufficient clearance so as to be free thereof, means co-operating with a side face of said centrally-located disk between the periphery and the axis thereof for indexing the carrier, and means co-operating with the centrally-located disk for locking the carrier.

21. In a machine of the class described, the combination of an indexible work spindle carrier having a centrally-located disk and a pair of end disks, rotatable work spindles supported for rotation by the end disks and passing through the centrally-located disk with sufficient clearance so as to be free thereof, means co-operating with a side face of said centrally-located disk between the periphery and the axis thereof for indexing the carrier, and means controlled by the indexing mechanism and co-operating with the centrally-located disk for locking the carrier in its indexed position.

Signed at Cleveland, Ohio, this 26th day of September, 1928.

ALFRED E. DRISSNER.

Signed at Windsor, Vermont, this 1st day of October, 1928.

CHARLES Q. GAREY.